US008919950B2

(12) United States Patent
Veis

(10) Patent No.: US 8,919,950 B2
(45) Date of Patent: Dec. 30, 2014

(54) PALLET TRANSFER DEVICE

(71) Applicant: Hewlett-Packard Industrial Printing Ltd., Natanya (IL)

(72) Inventor: Alex Veis, Natanya (IL)

(73) Assignee: Hewlett-Packard Industrial Printing Ltd., Netanya (IL)

( * ) Notice: Subject to any disclaimer, the term of this patent is extended or adjusted under 35 U.S.C. 154(b) by 28 days.

(21) Appl. No.: 13/688,710

(22) Filed: Nov. 29, 2012

(65) Prior Publication Data

US 2013/0088554 A1 Apr. 11, 2013

Related U.S. Application Data

(63) Continuation-in-part of application No. PCT/US2011/024372, filed on Feb. 10, 2011.

(51) Int. Cl.

| | |
|---|---|
| ***B41J 2/01*** | (2006.01) |
| ***B41J 11/00*** | (2006.01) |
| ***B65G 37/00*** | (2006.01) |
| ***B65G 17/48*** | (2006.01) |
| ***B65G 17/12*** | (2006.01) |
| ***B65G 17/06*** | (2006.01) |

(52) U.S. Cl.

CPC ............... *B41J 11/007* (2013.01); *B65G 37/00* (2013.01); *B65G 17/48* (2013.01); *B65G 17/12* (2013.01); *B65G 17/06* (2013.01); *B65F 17/123* (2013.01)

USPC ............................ 347/104; 347/105; 347/101

(58) Field of Classification Search

CPC ........ B65G 17/00; B65G 17/06; B65G 17/48; B65G 17/12; B65G 17/123; B41J 11/07; B41J 13/10

USPC .................. 347/104, 105, 101; 198/797–800

See application file for complete search history.

(56) References Cited

U.S. PATENT DOCUMENTS

| | | | | |
|---|---|---|---|---|
| 4,031,825 | A | 6/1977 | Jaffa | |
| 4,264,004 | A | 4/1981 | Harwick | |
| 4,383,605 | A | 5/1983 | Harwick | |
| 4,927,486 | A | 5/1990 | Fattal et al. | |
| 4,946,298 | A | 8/1990 | Oka et al. | |
| 5,009,306 | A | 4/1991 | Roderick et al. | |
| 5,642,604 | A * | 7/1997 | Muller | 53/448 |
| 6,293,387 | B1 | 9/2001 | Forster | |

(Continued)

FOREIGN PATENT DOCUMENTS

| | | |
|---|---|---|
| CN | 201685541 | 12/2010 |
| EP | 0609669 | 8/1994 |
| KR | 20090044459 | 5/2009 |

OTHER PUBLICATIONS

Paul G. Ranky, "Assembly Automation," www.emeraldinsight.com, ISSN 0144-5154, vol. 27, No. 2, pp. 97-102, 2007.

*Primary Examiner* — Henok Legesse

(57) ABSTRACT

In one example, a pallet conveyor includes: a forward track to guide pallets from an upstream part of the forward track to a downstream part of the forward track; a return track; and a pallet transfer device configured to simultaneously (1) continuously receive pallets from a downstream part of the return track and give pallets to the upstream part of the forward track and (2) continuously receive pallets from the downstream part of the forward track and give pallets to an upstream part of the return track.

20 Claims, 4 Drawing Sheets

(56) References Cited

U.S. PATENT DOCUMENTS

| | | | | |
|---|---|---|---|---|
| 6,422,139 | B1 | 7/2002 | DeCruz | |
| 6,652,088 | B1 | 11/2003 | Palmer et al. | |
| 6,702,438 | B2 * | 3/2004 | Codos et al. | 347/106 |
| 7,185,886 | B2 | 3/2007 | Tamura | |
| 7,987,969 | B2 | 8/2011 | Detmers et al. | |
| 2001/0045970 | A1 | 11/2001 | Burikov et al. | |
| 2002/0007789 | A1 | 1/2002 | Doyle et al. | |
| 2007/0126832 | A1 | 6/2007 | Kito | |
| 2007/0194034 | A1 * | 8/2007 | Vasiadis | 221/21 |
| 2008/0192075 | A1 | 8/2008 | Campion et al. | |
| 2009/0056567 | A1 | 3/2009 | Ando et al. | |
| 2009/0276084 | A1 | 11/2009 | Pandit et al. | |

* cited by examiner

PALLET TRANSFER DEVICE

CROSS REFERENCE TO RELATED APPLICATIONS

This is a continuation in part of international patent application number PCT/US2011/024372 filed 10 Feb. 2011 and titled Media Transport Assembly.

BACKGROUND

Some inkjet printers are capable of printing on very large rigid print substrates. Efficiently handling large rigid print substrates presents special challenges compared to handling more traditional print substrates.

DRAWINGS

The same part numbers designate the same or similar parts throughout the figures.

DESCRIPTION

International patent application number PCT/US2011/024372 discloses an inkjet printer that uses an endless conveyor to circulate pallets through a print zone to support the print substrate during printing. Although the pallet conveyor disclosed in PCT/US2011/024372 may be used with other print substrates, it is particularly well suited for handling corrugated boards, cardboards, and other large rigid print substrates. A new device has been developed for use in a pallet conveyor such as that disclosed in PCT/US2011/024372 to improve the transfer of pallets between the forward track that carries pallets through the print zone and the return track that carries pallets back to the start of the forward track.

In one example, a new pallet transfer device includes two wheel elevators that transfer pallets between the forward track and the return track. The first wheel elevator is operatively coupled between the downstream part of the return track and the upstream part of the forward track to receive pallets from the return track and give pallets to the forward track. The second wheel elevator is operatively coupled between the downstream part of the forward track and the upstream part of the return track to receive pallets from the forward track and give pallets to the return track. In one particular implementation, the wheel elevators are configured to give each pallet to one track at the same speed and in the same orientation the pallet is received from the other track, to maintain printer speed and to help keep the pallets from disturbing the print substrate during loading and unloading.

Examples of the new transfer device will be described with reference to a pallet conveyor supporting print substrates in an inkjet printer. Examples of the new transfer device, however, are not limited to use in inkjet printers, but may be implemented in other printers or with pallet conveyor systems used in other types of devices. Accordingly, the examples shown in the figures and described below illustrate but do not limit the invention which is defined in the claims following this Description.

As used in this document, a "wheel elevator" means a device employing a wheel or wheels to move an article along the perimeter or other arc of the wheel(s) from one location to another location.

Figure 1:
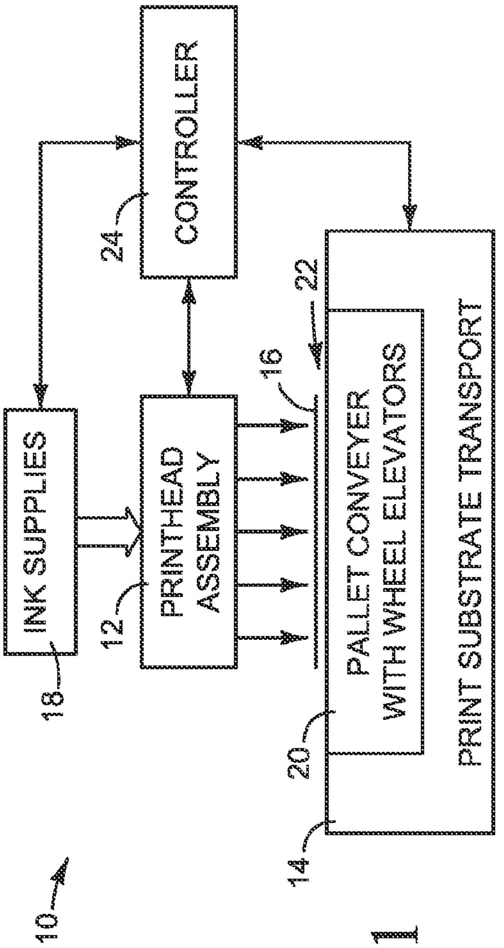
FIG. 1 is a block diagram illustrating an inkjet printer in which examples of a new pallet conveyor for print substrate transport may be implemented.

FIG. 1 is a block diagram illustrating an inkjet printer 10 in which examples of a new pallet conveyor may be implemented. Referring to FIG. 1, printer 10 includes a printhead assembly 12, a print substrate transport system 14 for moving a print substrate 16 past printhead assembly 12, and ink supplies 18 for supplying ink to printhead assembly 12. Printhead assembly 12 includes an arrangement of one or more printheads for dispensing ink on to a sheet or continuous web of paper or other print substrate 16. Printhead assembly 12 may be stationary with a substrate wide array of printheads or carriage mounted to scan the printhead(s) back and forth across substrate 16.

Print substrate transport 14 includes a pallet conveyor 20 that moves groups of pallets through the print zone 22 to support print substrate 16 under printhead assembly 12. As described in detail below, pallet conveyor 20 utilizes a pair of wheel elevators to transfer pallets between the forward track and the return track. Printer 10 also includes an electronic controller 24 which represents generally the programming, processor(s) and associated memories, and the electronic circuitry and components needed to control the operative elements of printer 10.

Figure 2:
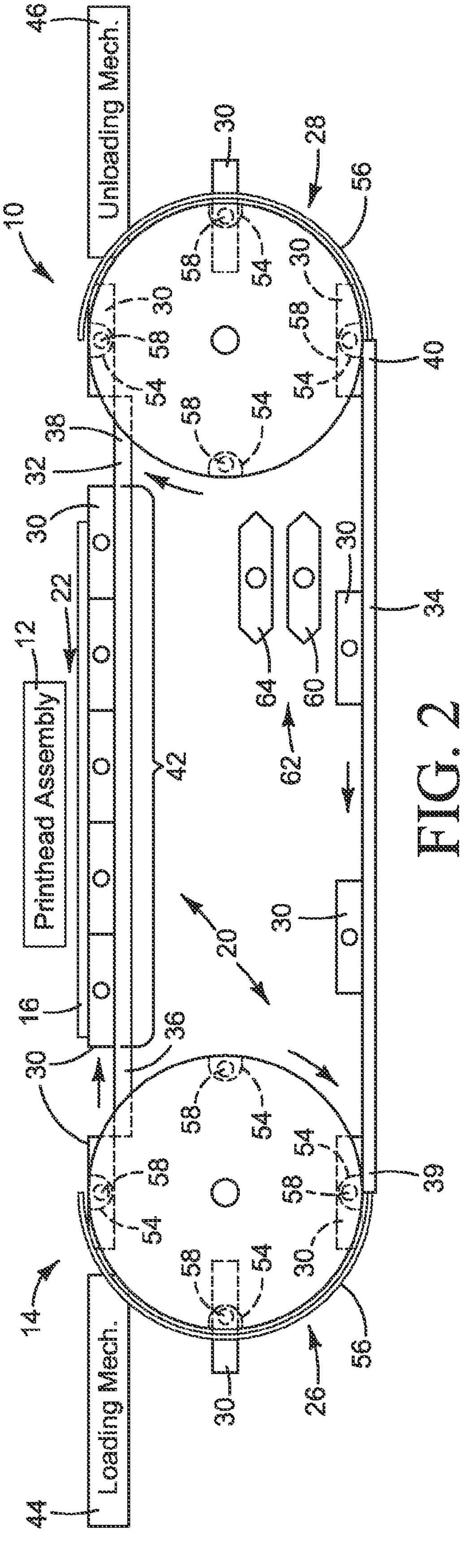
FIGS. 2 and 3 are front and side elevation views, respectively, illustrating an inkjet printer implementing one example of a new pallet conveyor in which wheel elevators are used to transfer pallets between the forward track and the return track.
Figure 3:
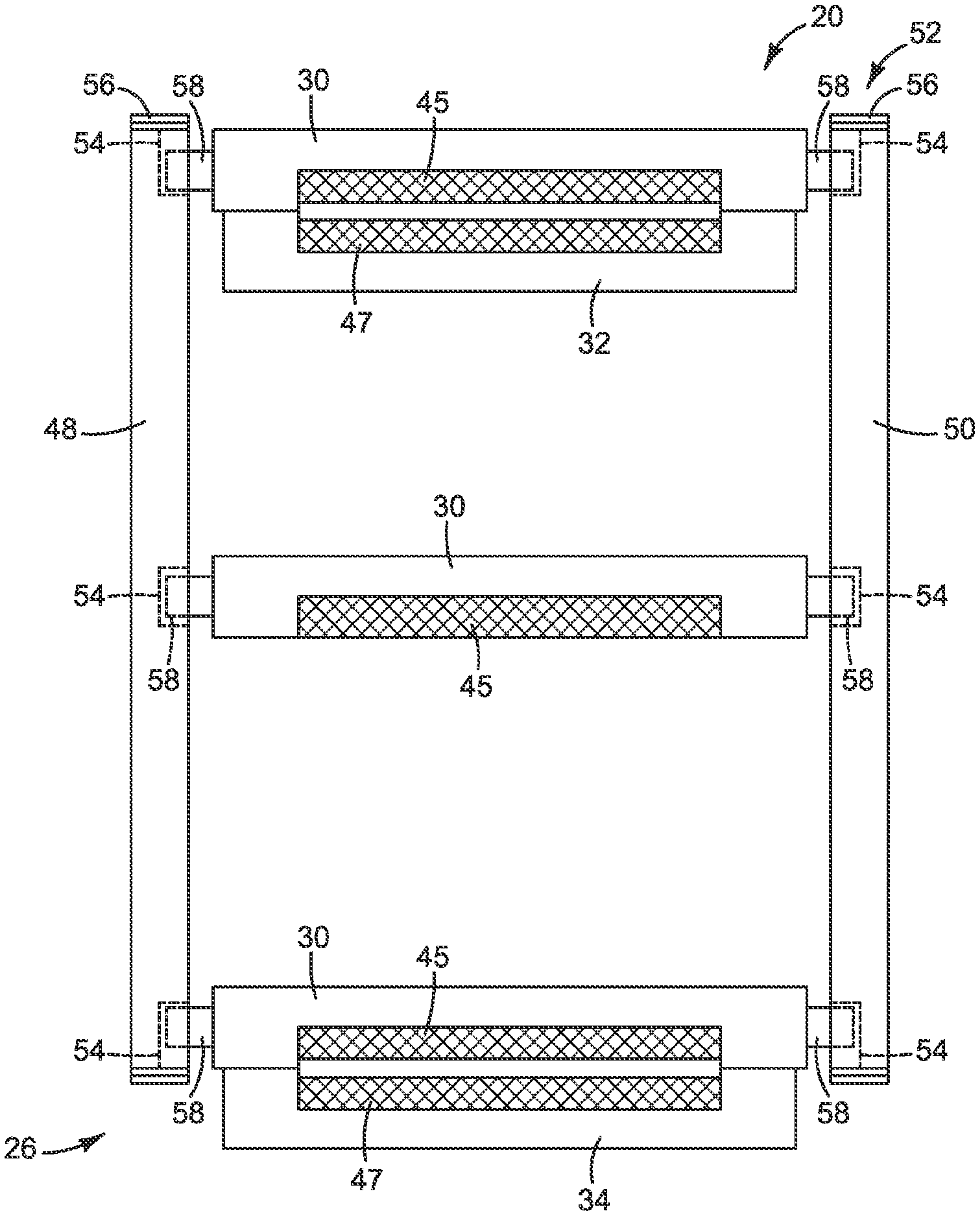
Figure 4:
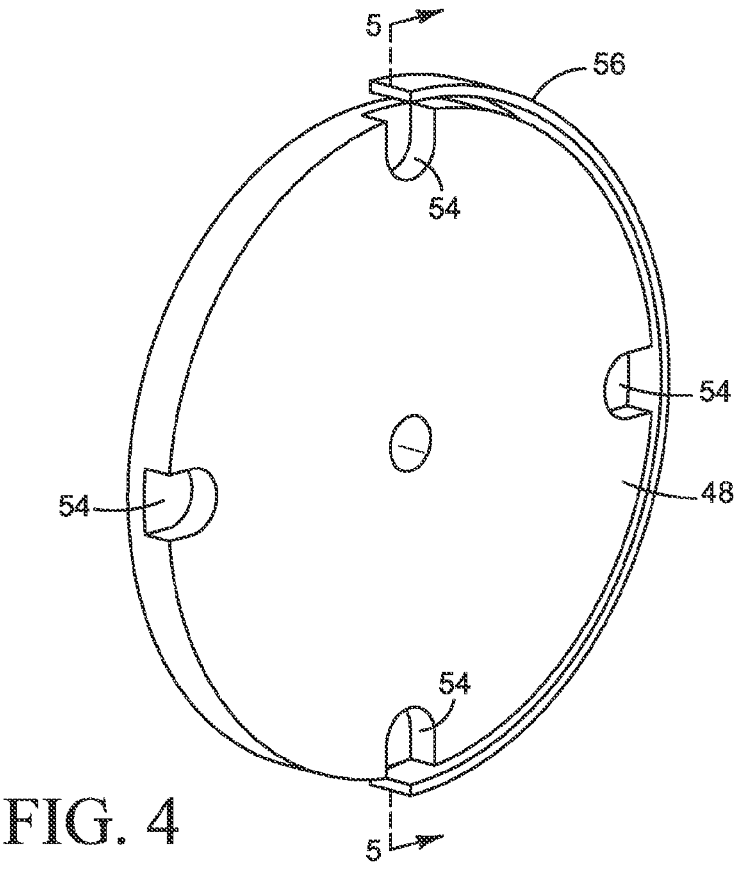
FIGS. 4 and 5 are detail views showing one of the wheels in a wheel elevator shown in FIGS. 2 and 3.
Figure 5:
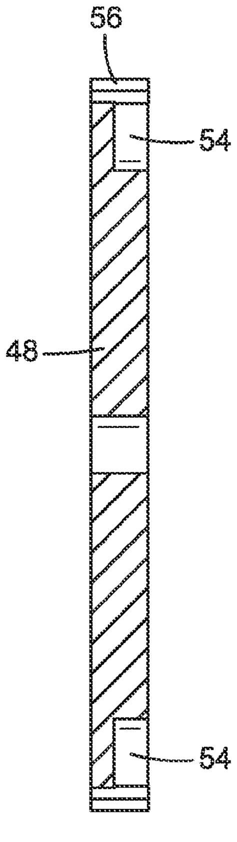

FIGS. 2 and 3 are front and side elevation views, respectively, illustrating an inkjet printer 10 implementing one example of a new pallet conveyor 20 in which wheel elevators 26, 28 are used to transfer pallets 30 between the conveyor forward track 32 and the conveyor return track 34. Only conveyor 26 is seen in FIG. 3. Referring to FIGS. 2 and 3, print substrate transport 14 includes an endless conveyor 20 to circulate pallets 30 through print zone 22. The forward track 32 of conveyor 20 guides pallets 30 through print zone 22 from an upstream part 36 to a downstream part 38. The first wheel elevator 26 is operatively coupled between the downstream part 39 of return track 34 and the upstream part 36 of forward track 32 to receive pallets 30 from return track 34 and give pallets 30 to forward track 32. The second wheel elevator 28 is operatively coupled between the downstream part 38 of forward track 32 and the upstream part 40 of return track 34 to receive pallets 30 from forward track 32 and give pallets 30 to return track 34.

In the example shown in FIG. 2, some of the pallets 30 are grouped together along forward track 32 to carry a substrate sheet 16 through print zone 22. Substrate sheet 16 in FIG. 2 represents generally a flexible sheet, a rigid board, or any other substrate printed as individual pieces. The speed of pallets 30 may be controlled individually to join and leave pallet group 42 and controlled collectively as a group 42 to maintain the desired speed of print substrate 16 through print zone 22. Transport 14 may also include a loading mechanism 44 to load substrate sheets 16 on to pallets 30 and an unloading mechanism 46 to unload substrate sheets 16 from pallets 30. Examples of conveyor tracks 32 and 34, loading mechanism 44, and unloading mechanism 46 are described in patent application number PCT/US2011/024372 (WO 2012/

108870), which is incorporated herein by reference in its entirety. Electromagnetic elements 45 and 47 on tracks 32, 34 and on pallets 30 are shown in FIG. 3 as one example conveyor motor system described in application PCT/US2011/024372. The forward track 32 includes a pair of rails, and the return track 34 includes a pair of rails. Pallets are rollingly supported by rollers on the rails of the forward track, and pallets are rollingly supported by rollers on the rails of the return track. The pallets are moveable relative to the rails of each of the forward track and the return track. In other implementations, each track 32, 34 includes a single rail.

In addition, in an implementation, the magnetic element of a respective one of the pallets and the magnetic element within the forward or return track comprise reciprocal first and second portions with one of the respective first and second portions comprising an electromagnetic element and the other of the respective first and second portions comprising a magnetically responsive material. Electromagnetic control can be exerted over the velocity of the pallets relative to track using the magnetic elements of the forward or return track.

Referring to FIGS. 2-5, each wheel elevator 26, 28 includes a pair of wheels 48, 50 positioned opposite one another on each side of conveyor tracks 32, 34, and a holder 52 operatively connected to each pair of wheels 48, 50 to receive, hold and release pallets 30 for transfer between tracks 32 and 34. An electric motor or other suitable drive mechanism (not shown) operatively coupled to controller 24 may be used to rotate each pair of wheels 48, 50. In the example shown, each holder 52 includes a series of openings 54 along the perimeter of wheels 48, 50 and a stationary guide 56 that together passively receive, hold and release axles 58 on pallets 30. Also, pallets 30 and holders 52 are configured to give each pallet 30 to one track 32, 34 in the same orientation the pallet is received from the other track 32, 34. The desired pallet orientation may be maintained, for example, by allowing pallet axles 58 to rotate freely within openings 54 and/or by allowing the body of each pallet 30 to rotate freely on axles 58. Other suitable configurations for holders 52 are possible. For example, a retractable gate at each opening 54 could be used to retain pallet axles 58 during the transfer between conveyor tracks 32 and 34. For another example, an electromagnetic latch could be employed to receive, hold and release pallets 30 during the transfer.

Wheel elevators 26, 28 for pallet transfer in conveyor 20 enable the simultaneous and continuous transfer of pallets to and from tracks 32 and 34. Thus, in one mode for operating conveyor 20, each pair of elevator wheels 48, 50 is turned simultaneously with the other pair so that first wheel elevator 26 continuously receives pallets 30 from return track 34 and gives pallets to forward track 32 while second wheel elevator 28 continuously receives pallets 30 from forward track 32 and gives pallets 30 to return track 34. Although other conveyor operating modes are possible, it is expected that both elevator wheel pairs 48, 50 will usually be turned at the same time for simultaneously transferring pallets to and from tracks 32 and 34.

Wheel elevators 26 and 28 may be configured to give each pallet 30 to one track 32 or 34 at the same speed (as well as the same orientation) the pallet is received from the other track 32 or 34, to help maintain printer speed and to help keep pallets 30 from disturbing substrate 16 during loading and unloading. The number and spacing of openings 54 may be varied from that shown to help achieve the desired speed and/or spacing of pallets 30. Also, the rotational speed of each pair of wheels 48, 50 may be incrementally or continuously adjusted by controller 24 to match the speed of openings 54 at the perimeter of wheels 48, 50 to the speed of pallets 30 on tracks 32 and 34. The rotational speed of each wheel pair 48, 50 need not be the same. It may be desirable for some printer operations to drive the wheels in first elevator 26 faster or slower than the wheels in second elevator 28.

Figure 6:
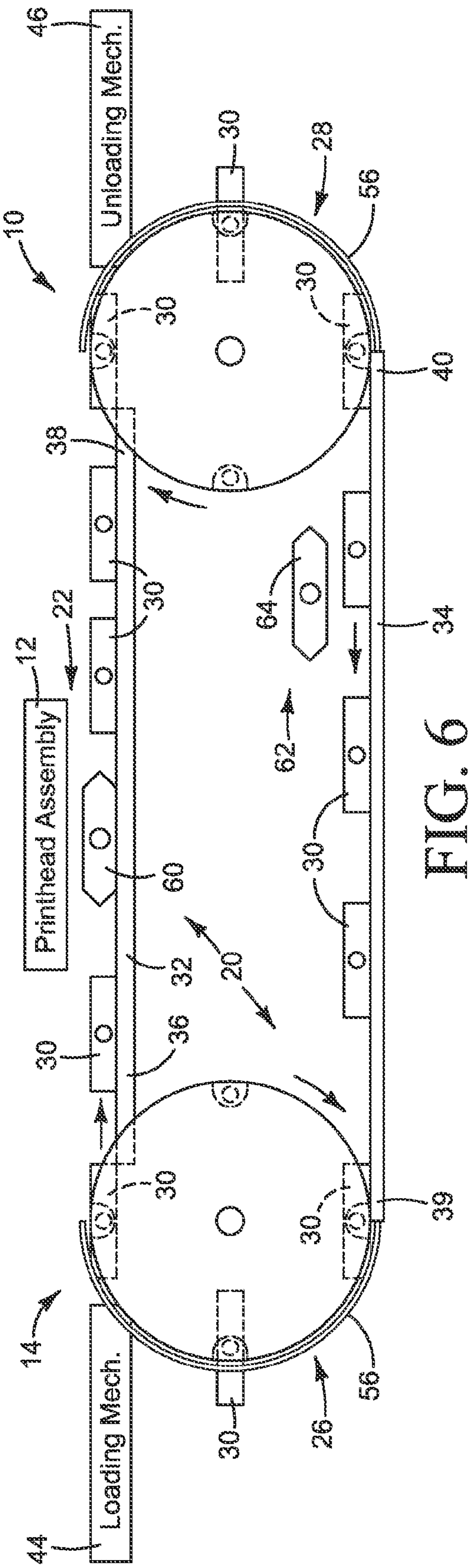
FIG. 6 illustrates an inkjet printer such as the one shown in FIGS. 2 and 3 in which the pallet conveyor is configured to deploy a service station to the printhead assembly.

Pallet conveyor 20 may also be configured to deploy a service station to printhead assembly 12. For example, and referring to FIG. 6, a service station 60 has been deployed from a garage 62 along tracks 32, 34 to printhead 12 where it can perform a service operation. A second service station 64 remains in garage 62. Each service station 60, 64 represents a spittoon, wiper, suction or other servicing device implemented in a pallet-like unit for deployment along conveyor 20. At the direction of controller 24, a robotic arm or other suitable transfer mechanism (not shown) may be used to place service stations 60, 64 on to return track 34 and take the service stations 60, 64 off track 34 to return them to garage 62.

Figure 7:
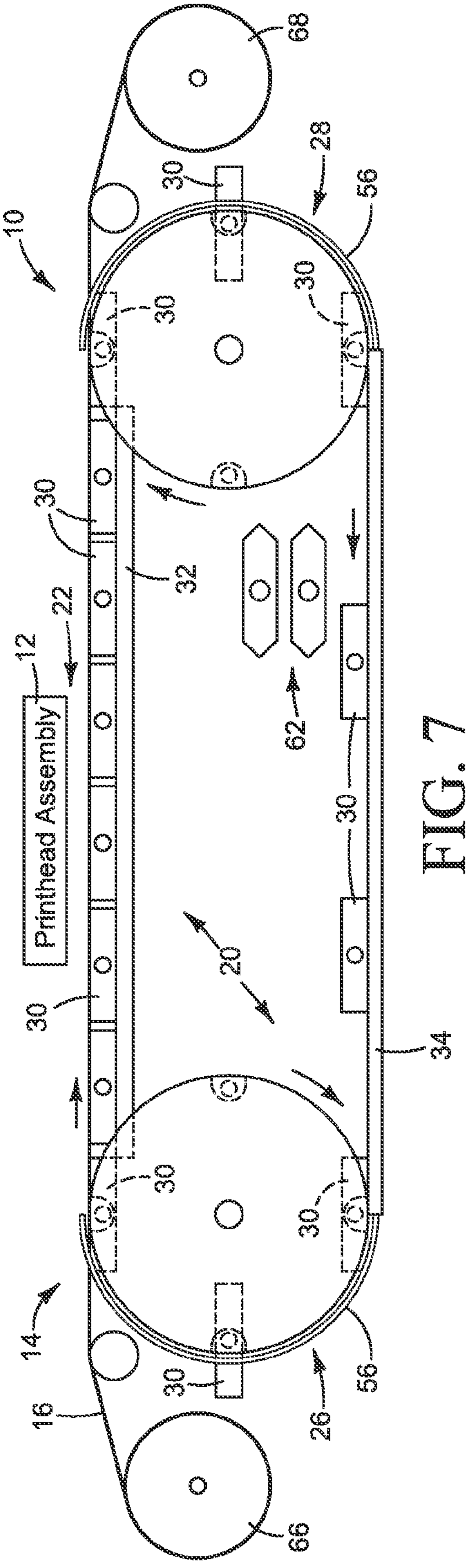
FIG. 7 illustrates an inkjet printer in which a pallet conveyor such as the one shown in FIGS. 2 and 3 supports a continuous web of print substrate.

In the example shown in FIG. 7, a continuous web print substrate 16 is supported by pallets 30. Vacuum pallets 30 such as those described in application PCT/US2011/024372 may be used to advance web 16 through print zone 22 from a supply roll 66 to a take-up roll 68. The use of vacuum pallets 30 for advancing web 16 relieves undesirable tension in web 16 otherwise developed when take-up roll 68 pulls web 16 through print zone 22.

As noted at the beginning of this Description, the examples shown in the figures and described above illustrate but do not limit the invention. Other examples may be made and implemented. Therefore, the foregoing description should not be construed to limit the scope of the invention, which is defined in the following claims.

What is claimed is:

1. A pallet conveyor, comprising:

a forward track including a forward track rail to guide pallets from an upstream part of the forward track to a downstream part of the forward track;

a return track including a return track rail, the pallets being moveable relative to each of the forward track rail and the return track rail; and a pallet transfer device configured to:

receive the pallets from a downstream part of the return track and release the pallets to the upstream part of the forward track, wherein a first pallet of the pallets disengages from the return track rail as the first pallet is received by the pallet transfer device, and a second pallet of the pallets is released onto the forward track rail and disengages from the pallet transfer device as the second pallet is released to the upstream part of the forward track; and receive the pallets from the downstream part of the forward track and release the pallets to an upstream part of the return track.

2. The pallet conveyor of claim 1, wherein the pallet transfer device is configured to release each respective pallet to one track in the same orientation the respective pallet is received from the other track.

3. The pallet conveyor of claim 1, wherein the pallet transfer device includes:

a first wheel elevator operatively coupled between the downstream part of the return track and the upstream part of the forward track to receive pallets from the return track and release pallets to the forward track; and a second wheel elevator operatively coupled between the downstream part of the forward track and the upstream part of the return track to receive pallets from the forward track and release pallets to the return track.

4. The pallet conveyor of claim 3, wherein each of the first and second wheel elevators includes:

a pair of wheels spaced apart from one another on opposite sides of the tracks; and a holder operatively connected to the pair of wheels to receive a given pallet from one track, hold the given pallet on the wheels, and release the given pallet to the other track.

5. The pallet conveyor of claim 3, wherein each respective wheel elevator of the first and second wheel elevators, includes:

multiple openings along a perimeter of the respective wheel elevator each opening configured to receive an axle on a given pallet; and a given one of the openings to hold the axle on the given pallet for at least part of one revolution of the respective wheel elevator as the given pallet is transferred from one track to the other track.

6. The pallet conveyor of claim 5, further comprising a retainer to retain the axle on the given pallet for at least the part of one revolution of the respective wheel elevator.

7. The pallet conveyor of claim 1, wherein the pallet transfer device includes a rotatable wheel including openings to receive the pallets from the downstream part of the return track and release the pallets to the upstream part of the forward track, wherein the release of each respective pallet from the rotatable wheel causes the respective pallet to disengage from the wheel.

8. The pallet conveyor of claim 1, wherein the forward track further includes rollers on the forward track rail, wherein the pallets are moveable relative to the forward track rail on the rollers.

9. The pallet conveyor of claim 1, wherein each of the pallets includes a magnetic element, and each of the forward track and the return track includes a magnetic element, and wherein movement of a given pallet of the pallets is based on interaction of the magnetic element of the given pallet and the magnetic element of a respective one of the forward track and the return track.

10. An apparatus for supporting print media in a printer, comprising:

multiple pallets;

an endless conveyor to circulate the pallets through a print zone to support a print substrate during printing, the endless conveyor comprising:

a forward track including a forward track rail to guide the pallets through the print zone from an upstream part of the forward track to a downstream part of the forward track;

a return track including a return track rail, the pallets being movable relative to each of the forward track rail and the return track rail;

a first wheel elevator operatively coupled between a downstream part of the return track and the upstream part of the forward track to receive the pallets from the return track and release the pallets to the forward track, wherein a first pallet of the pallets disengages from the return track rail as the first pallet is received by the first wheel elevator, and a second pallet of the pallets is released onto the forward track rail and disengages from the first wheel elevator as the second pallet is released to the upstream part of the forward track; and a second wheel elevator operatively coupled between the downstream part of the forward track and an upstream part of the return track to receive the pallets from the forward track and release the pallets to the return track.

11. The apparatus of claim 10, wherein each of the first and second wheel elevators is configured to release each respective pallet to one track in the same orientation the respective pallet is received from the other track.

12. The apparatus of claim 10, wherein each of the first and second wheel elevators is configured to release each respective pallet to one track at the same speed and in the same orientation the respective pallet is received from the other track.

13. The apparatus of claim 10, wherein the forward track further includes rollers on the forward track rail, wherein the pallets are movable relative to the forward track rail on the rollers.

14. The apparatus of claim 13, wherein the forward track includes the forward track rail and another forward track rail, and wherein the rollers are arranged on the forward track rails.

15. The apparatus of claim 10, wherein each of the pallets includes a magnetic element, and each of the forward track and the return track includes a magnetic element, and wherein movement of a given pallet of the pallets is based on interaction of the magnetic element of the given pallet and the magnetic element of a respective one of the forward track and the return track.

16. A printer, comprising:

a printhead assembly defining a print zone where ink may be applied to a print substrate;

multiple pallets;

an endless conveyor to circulate the pallets through the print zone to support the print substrate during printing, the endless conveyor comprising:

a forward track including a forward track rail to guide the pallets through the print zone from an upstream part of the forward track to a downstream part of the forward track;

a return track including a return track rail, the pallets being movable relative to each of the forward track rail and the return track rail;

a first wheel elevator operatively coupled between a downstream part of the return track and the upstream part of the forward track to receive the pallets from the return track and release the pallets to the forward track, wherein a first pallet of the pallets disengages from the return track rail as the first pallet is received by the first wheel elevator, and a second pallet of the pallets is released onto the forward track rail and disengages from the first wheel elevator as the second pallet is released to the upstream part of the forward track; and a second wheel elevator operatively coupled between the downstream part of the forward track and an upstream part of the return track to receive the pallets from the forward track and release the pallets to the return track.

17. The printer of claim 16, further comprising a service pallet selectively movable on and off the conveyor and including a device for servicing the printhead assembly.

18. The printer of claim 16, further comprising a rigid print substrate sheet supported on the pallets in the print zone.

19. The printer of claim 16, further comprising a continuous print substrate web supported on the pallets in the print zone.

20. The printer of claim 19, wherein the pallets are configured to move the web through the print zone.

* * * * *

UNITED STATES PATENT AND TRADEMARK OFFICE

CERTIFICATE OF CORRECTION

PATENT NO. : 8,919,950 B2
APPLICATION NO. : 13/688710
DATED : December 30, 2014
INVENTOR(S) : Alex Veis It is certified that error appears in the above-identified patent and that said Letters Patent is hereby corrected as shown below:

ON THE TITLE PAGE

Item (71), Applicant, in column 1, line 2, delete "Natanya" and insert -- Netanya --, therefor.

Item (72), Inventor, in column 1, line 1, delete "Natanya" and insert -- Netanya --, therefor.

Signed and Sealed this
Tenth Day of May, 2016

Michelle K. Lee
*Director of the United States Patent and Trademark Office*